US012776292B2

(12) United States Patent
Kim et al.

(10) Patent No.: US 12,776,292 B2
(45) Date of Patent: Oct. 27, 2026

(54) IMAGE GHOSTING MITIGATION FOR ALWAYS-ON DISPLAY PANELS WHEN DISPLAYING HIGH ON-PIXEL RATIO IMAGES

(71) Applicant: Google LLC, Mountain View, CA (US)

(72) Inventors: Hyunchul Kim, San Jose, CA (US); Chien-Hui Wen, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 19/060,187

(22) Filed: Feb. 21, 2025

(65) Prior Publication Data

US 2025/0218415 A1 Jul. 3, 2025

Related U.S. Application Data

(60) Provisional application No. 63/759,646, filed on Feb. 18, 2025.

(51) Int. Cl.

| | |
|---|---|
| ***G09G 5/36*** | (2006.01) |
| ***G09G 3/3208*** | (2016.01) |
| ***G09G 5/10*** | (2006.01) |

(52) U.S. Cl.

CPC ............. *G09G 5/36* (2013.01); *G09G 3/3208* (2013.01); *G09G 5/10* (2013.01); *G09G 2320/0257* (2013.01); *G09G 2320/0626* (2013.01)

(58) Field of Classification Search

CPC .......... G09G 5/36; G09G 3/3208; G09G 5/10; G09G 2320/0257; G09G 2320/0626

See application file for complete search history.

(56) References Cited

U.S. PATENT DOCUMENTS

| | | | | |
|---|---|---|---|---|
| 8,284,318 | B2 * | 10/2012 | Sato | G09G 5/397 348/687 |
| 8,878,757 | B2 * | 11/2014 | Yoshida | G09G 3/3406 345/84 |
| 2016/0133223 | A1 * | 5/2016 | Kim | G09G 3/3225 345/211 |
| 2020/0226980 | A1 * | 7/2020 | Park | G09G 3/3233 |
| 2020/0403186 | A1 | 12/2020 | Choi et al. | |

(Continued)

FOREIGN PATENT DOCUMENTS

| | | | |
|---|---|---|---|
| CN | 114974080 | A | 8/2022 |
| WO | 2015188595 | A1 | 12/2015 |
| WO | 2020192051 | A1 | 10/2020 |

OTHER PUBLICATIONS

Mienko, et al., ""Ultra-dark" OLED Panel Combining Polarization and Masking Layers", Technical Disclosure Commons, https://www.tdcommons.org/dpubs_series/7923, Mar. 18, 2025, 12 pages.

*Primary Examiner* — Rodney Amadiz
(74) *Attorney, Agent, or Firm* — Colby Nipper PLLC

(57) ABSTRACT

This document describes a technology for reducing image ghosting on Always-On Display (AOD) panels when displaying high On-Pixel Ratio (OPR) images. The disclosed technology utilizes a multi-scan rate-capable AOD display panel to address the ghosting effect when the panel transitions from displaying a low OPR image to a high OPR image. To mitigate image ghosting and/or transitional flicker, the system briefly displays the high OPR image at a high scan rate before switching to a lower scan rate. This approach helps reduce ghosting and flicker helping to ensure power efficiency.

14 Claims, 6 Drawing Sheets

(56) References Cited

U.S. PATENT DOCUMENTS

| | | | | |
|---|---|---|---|---|
| 2021/0312871 | A1* | 10/2021 | Park ..................... | G09G 3/3233 |
| 2024/0038154 | A1 | 2/2024 | Ryu et al. | |
| 2024/0078952 | A1 | 3/2024 | Choi et al. | |
| 2024/0096280 | A1* | 3/2024 | Choi .................... | G09G 3/3233 |
| 2024/0298509 | A1 | 9/2024 | Gong et al. | |

* cited by examiner

300

600

ACTIVATE IMAGE-GHOSTING-MITIGATION
520

SWITCH TO HIGH SCAN RATE
610

↓

DISPLAY 2ND OPR IMAGE AT HIGH SCAN RATE
612

MODIFY MULTIPLE FRAMES OF 2ND OPR IMAGE INTO A SEQUENCE OF FRAMES WITH INCREASING IMAGE INTENSITY
614

↓

INSERTING INCREASING-INTENSITY SEQUENCE OF FRAMES AT HIGH SCAN RATE
616

DISPLAYING FRAMES IN SEQUENCE FROM LOW TO HIGH INTENSITY
618

↓

SWITCH TO LOW SCAN RATE
614

↓

CONTINUE TO DISPLAY 2ND OPR IMAGE AT LOW SCAN RATE
616

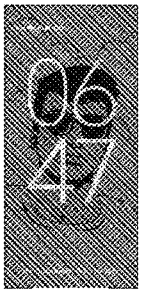

602

604

606

FIG. 6

IMAGE GHOSTING MITIGATION FOR ALWAYS-ON DISPLAY PANELS WHEN DISPLAYING HIGH ON-PIXEL RATIO IMAGES

CROSS-REFERENCE TO RELATED APPLICATION

This application claims the benefit of U.S. Provisional Patent Application Ser. No. 63/759,646 filed on Feb. 18, 2025, the disclosure of which is incorporated by reference herein in its entirety.

BACKGROUND

Always-On Display (AOD) technology represents a multi-scan capable display mechanism that maintains selective screen functionality during device dormancy. Typically, AOD technology is employed with OLED and AMOLED display matrices, augmented by LTPO (Low-Temperature Polycrystalline Oxide) backplanes, which enable dynamic scan rate (e.g., refresh rate) modulation between 1-120 Hz. AOD technology employs protocols to selectively activate pixels of display elements deemed worthy of remaining illuminated during device dormancy. Such display elements typically include temporal data, system status indicators, and critical notifications. This approach reduces power consumption without such technology.

SUMMARY

This document describes a technology for reducing image ghosting on Always-On Display (AOD) panels when displaying high On-Pixel Ratio (OPR) images. The disclosed technology utilizes a multi-scan rate-capable AOD display panel to address the ghosting effect that arises when the panel transitions from displaying a low OPR image (e.g., less than 25% of pixels active) to a high OPR image (e.g., more than 50% of pixels active). To mitigate image ghosting and/or transitional flicker, the system briefly displays the high OPR image at a high scan rate before switching to a lower scan rate. This approach helps reduce ghosting and flicker helping to ensure power efficiency.

This document also describes computer-readable media having instructions for performing the above-summarized method and other methods set forth herein, as well as systems and means for performing these methods.

This summary is provided to introduce simplified concepts for a technology for reducing image ghosting on Always-On Display (AOD) panels when displaying high On-Pixel Ratio (OPR) images, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of image-ghosting mitigation on Always-On Display (AOD) panels when displaying high On-Pixel Ratio (OPR) images are described in this document with reference to the following drawings. The same numbers are used throughout the drawings to reference like features and components:

FIG. 6 illustrates another example method for image-ghosting mitigation on AOD panels when displaying high OPR images in accordance with one or more implementations described herein.

DETAILED DESCRIPTION

Overview

Figure 1:
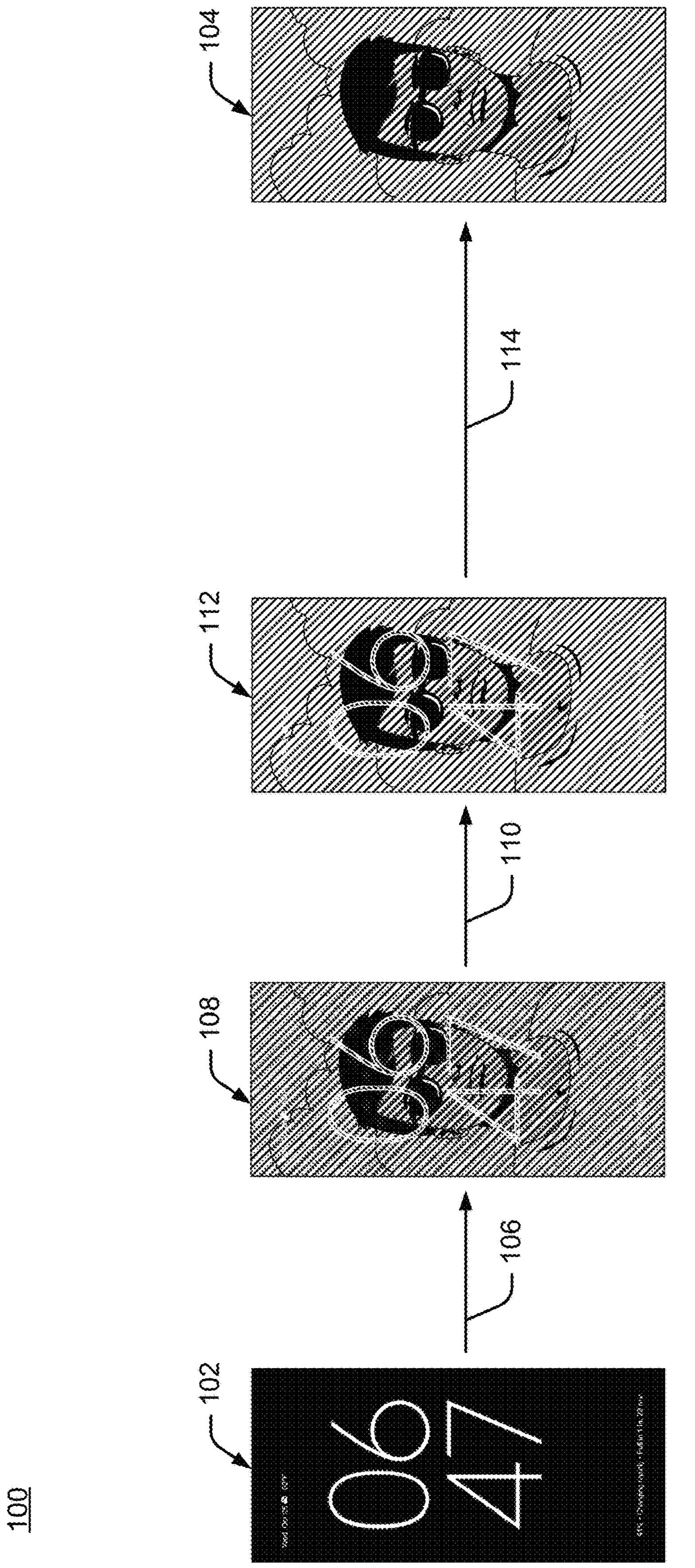
FIG. 1 illustrates an example of image ghosting that occurs when a display panel, operating at a low scan rate, transitions from displaying a low OPR image to a high OPR image.

A technology is described herein for reducing image ghosting on Always-On Display (AOD) panels when displaying high On-Pixel Ratio (OPR) images. The disclosed technology utilizes a multi-scan rate-capable AOD display panel to address the ghosting effect when the panel transitions from displaying a low OPR image to a high OPR image. To mitigate image ghosting and/or transitional flicker, the system briefly displays the high OPR image at a high scan rate before switching to a lower scan rate. This approach helps reduce ghosting and flicker helping to ensure power efficiency.

A typical display mechanism operating when its computing device is active and engaged often presents high OPR images at a high scan rate (e.g., refresh rate). This is often when a device user actively interacts with and views the display panel.

A multi-scan-capable display panel can accommodate various refresh rates. The refresh rate of a panel is the frequency, measured in cycles per second (e.g., Hz), at which a display panel systematically updates its entire visual buffer with new frame data through a complete vertical scanning cycle. Depending upon the implementation, a multi-scan capable display panel may have a standard refresh rate typically ranging from 1 to 120 Hz, with some variants achieving higher scan rates, such as 240 Hz. Herein, a high scan rate is twice as much (or more) than a low scan rate. For example, a high scan rate of 120 Hz is four times a low scan rate of 30 Hz. In this example, 120 Hz is four times as much as 30 Hz; thus, the high scan rate is at least twice as much as the low scan rate.

On-Pixel Ratio (OPR) constitutes a display metric that measures the proportion of illuminated pixels (e.g., "on" pixels) relative to the total display matrix (e.g., pixel count) of the display. The mathematical expression for OPR may be expressed as: (Number of Active Pixels)/(Total Number of Display Pixels). A high OPR image exhibits a substantial proportion of illuminated pixels relative to the total display matrix. This may be characterized by a mathematical ratio approaching 1.0 when calculated as (Active Pixels)/(Total Display Pixels). Typically, high OPR images manifest through dense pixel activation patterns, extensive utilization of illuminated regions, a minimal implementation of true black spaces, and complex color gradients requiring multiple active sub-pixels for representation. Depending upon the implementation, a high OPR image may have a ratio of "on pixel" to all display pixels of greater than 50%, greater than 60%, greater than 70%, greater than 80%, greater than 85%, greater than 90%, and/or greater than 95%.

To maximize power conservation (e.g., sometimes 1-2% of battery capacity per hour during operation), AOD enables continuous on-screen information presentation during device dormancy through selective pixel activation. Because of its power conservation, AOD is often employed in mobile devices, wearables, automotive systems, and professional equipment.

Typically, AOD panels utilize multi-scan capable Liquid Crystal Display (LCD), Organic Light-Emitting Diode (OLED), or Active-Matrix Organic Light-Emitting Diode (AMOLED) display architectures in conjunction with LTPO (Low-Temperature Polycrystalline Oxide) backplanes. AOD enables precise control of individual pixels.

AOD often utilizes low OPR images at a low scan rate (e.g., 30 Hz) to accomplish this. A low OPR image is a display-sized image that contains a minimal quantity of illuminated pixels relative to the total image/display area. Depending upon the implementation, a low OPR image may have a ratio of "on pixel" to all display pixels of less than 40%, less than 30%, less than 25%, less than 20%, less than 15%, less than 10%, and/or less than 5%.

Typically, low OPR images incorporate high-contrast elements against black backgrounds, limited color palettes, and spaced visual elements. In OLED display implementations, black pixels often remain in a deactivated state with zero power consumption, while illuminated pixels draw power proportionally to their brightness levels.

Unfortunately, electronic visual display (EVD) technologies, such as LCD, OLED, and AMLED, suffer from transitional image ghosting, a visual artifact that occurs when traces of a previous image briefly remain visible while the display shows a new image. Herein, transitional image ghosting is called "image ghosting." The visibility of this image ghosting effect varies depending on the display's specifications, particularly how quickly its pixels can respond to changes and how often the screen refreshes its image.

Image ghosting occurs because display pixels require a small amount of time to change from one state to another, creating a brief overlap between the old and new images. This is called panel hysteresis. The time needed for this change involves two main components: rise time, where pixels transition from darker to brighter states, and fall time, where pixels shift from brighter to darker states. In OLED displays, for example, this effect stems from the behavior of their organic materials, which have natural limitations in how quickly they can change states. Image ghosting becomes quite noticeable during rapid changes between highly contrasting different images.

Typically, image ghosting is mitigated by increasing frame insertion (e.g., updated). With a high scan rate (e.g., 120 Hz), new frames may be updated quickly (e.g., 8.3 milliseconds (ms)). Consequently, the image ghosting quickly dissipates, and a user might not notice. However, AOD panels are typically driven at a slow scan rate (e.g., 30 Hz). With such slow scan rates, panel hysteresis-thus, image ghosting—is worse than at a high scan rate. The frame update is slower (e.g., 33.2 ms), and thus, the image ghosting is much more noticeable.

FIG. 1 illustrates an example scenario 100 of image ghosting itself and the typical approach of frame-update based of image-ghosting mitigation using frame updates. In the example scenario 100, an AOD display panel of a device, operating at a low scan rate (e.g., 30 Hz), transitions between displaying highly contrasting different images: a low OPR image 102 to a high OPR image 104.

The transition depicted in the example scenario 100 may take a full second to mitigate the ghosted image. During this transition, the central control (e.g., System-on-a-Chip) of the device must stay engaged in order to send repeated frame updates until the image ghosting is mitigated. Thus, the central control cannot power down (e.g., sleep mode) to conserve power.

At arrow 106, the central control sends a first frame containing the high OPR image 104 and it is applied to the display panel. Consequently, the display panel displays a first ghosted image 108, which includes the newly displayed high OPR image with a residual or "ghost" image of the low OPR image.

Using the typical approach of addressing a ghosted image effect, as seen in the first ghosted image 108, the central control of the device repeatedly refreshes the display panel with the new image (e.g., the high OPR image 104). For example, the central control of the device sends a self-refresh command to the display panel, which causes additional frames of the high OPR image to be displayed. Subsequently, as indicated by arrow 110, the display panel presents a second ghosted image 112, in which the high OPR image remains visible while the low OPR image fades away. As indicated by arrow 114, the central control of the device continues to send frames to eliminate the ghosting effect. Consequently, the high OPR image 104 is eventually displayed without the low OPR image being visible.

Operating Environment and Suitable Computing Device

Figure 2:
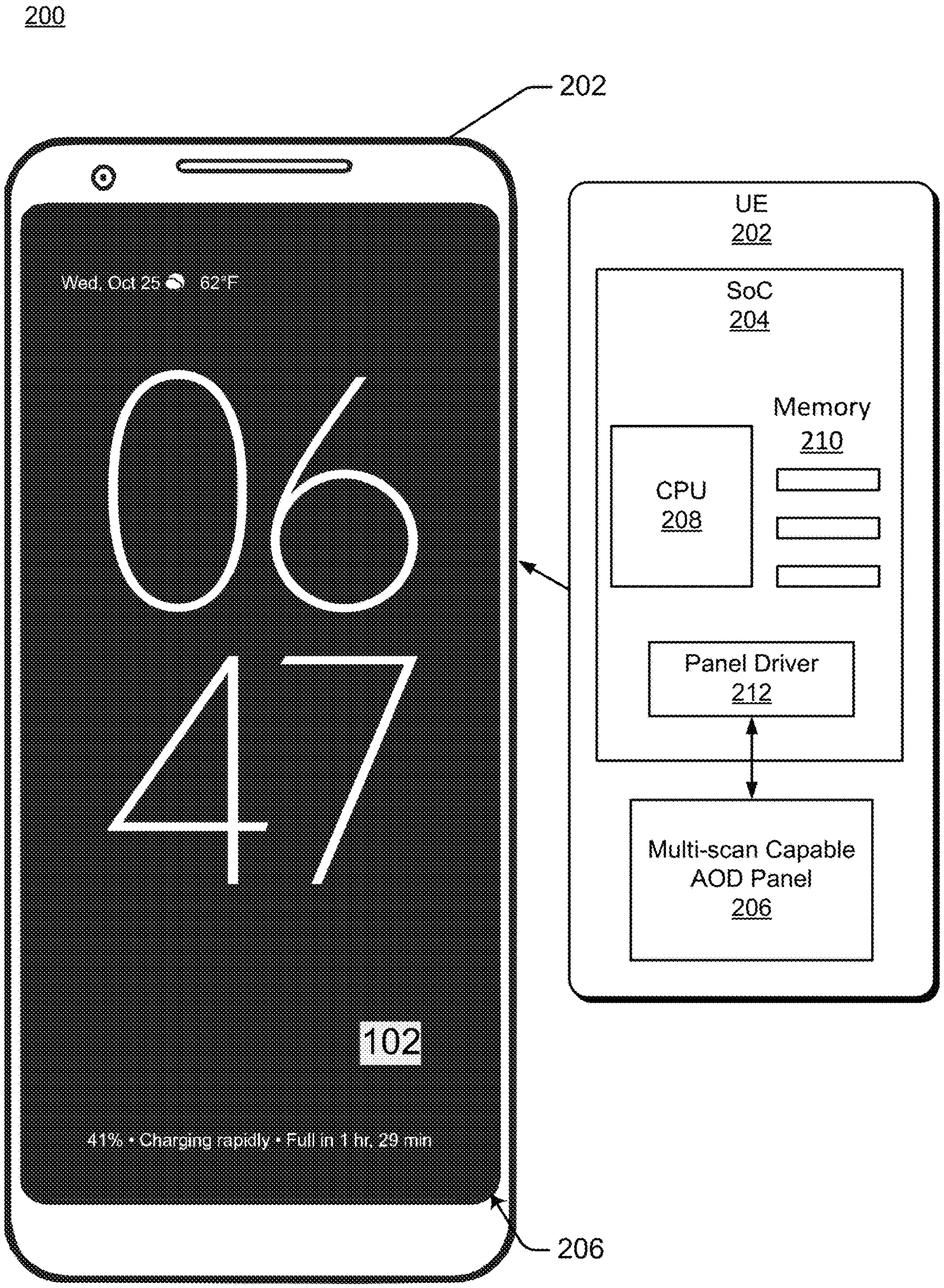
FIG. 2 illustrates an example operating environment in which techniques for image-ghosting mitigation on Always-On Display (AOD) panels when displaying high On-Pixel Ratio (OPR) images can be implemented and an example of a suitable computing device.

FIG. 2 illustrates an example environment 200 in which techniques for image-ghosting mitigation on Always-On Display (AOD) panels when displaying high On-Pixel Ratio (OPR) images can be implemented and an example of a suitable computing device. The example environment 200 includes user equipment (UE) 202 (e.g., a smartphone, smartwatches, wearables, and tablets), which includes or is associated with a system-on-a-chip (SoC) 204 and a multi-scan capable AOD panel 206. The user equipment 202 is an example of suitable computing device. As depicted, the user equipment 202 displays the low OPR image 102 on its multi-scan capable AOD panel 206.

In the example environment 100, the SoC 204 is the central control of the user equipment 202. More particularly, the SoC 204 is an integrated circuit consolidating multiple electronic components onto a single silicon die. This architectural paradigm encompasses the primary processing units, basic system components, and other specialized hardware accelerators. As depicted, the SoC 204 includes a central processing unit (CPU) 208, memory system 210, and panel driver 212.

Examples of other components, which are not shown, that the SoC 204 may include are a graphics processing unit (GPU), digital signal processor (DSP), neural processing unit (NPU), image signal processor (ISP), memory controllers, wireless communication modules, security elements, and input/output interfaces. The integration of these diverse components onto a single chip facilitates efficient power management, reduces physical space requirements, and enables high-speed inter-component communication through dedicated pathways. Typically, the SoC design also incorporates various peripheral controllers, voltage regulators, and timing circuits, ensuring synchronized operation of all integrated components while maintaining thermal efficiency within the confined space of a mobile device chassis.

While the implementations described herein employ SoC technology, other implementations with the same functionality may be employed.

The CPU 208 operates as the primary computational engine within the user equipment 202, executing mathematical and logical operations. The CPU 208 interfaces with a memory system 210 that may extend from rapid-access cache memory through volatile main memory. This enables program execution through systematic instruction fetch, decode, and execute cycles while managing data transfer across the memory bus system.

The panel driver 212 converts digital image data into precise analog voltage signals. The panel driver 212 orchestrates the activation timing and intensity modulation of individual pixels within a display matrix to render visual content according to specified refresh parameters and color depth requirements. The panel driver 212 drives according to a timing element (TE) clock, which is responsible for synchronizing pixel updates with the display's refresh rate. The timing element generates timing signals that control when each pixel row is activated during the screen refresh cycle. Doing this maintains image stability and prevents visual artifacts like screen tearing.

The CPU 208 manages display output by issuing high-level commands to the panel driver 212 that define parameters such as resolution, refresh rate, and frame buffer locations. The panel driver 212, operating as an intermediary controller, translates these CPU instructions into precise electrical signaling protocols that directly control the physical pixel matrix of the multi-scan capable AOD panel 206. Thus, the panel driver 212 handles, for example, the continuous refresh operations and voltage regulation required for stable image reproduction. As the name suggests, the multi-scan capable AOD panel 206 is an AOD display panel that can accommodate various refresh rates.

Example Image—Ghosting Mitigation Operations

Figure 3:
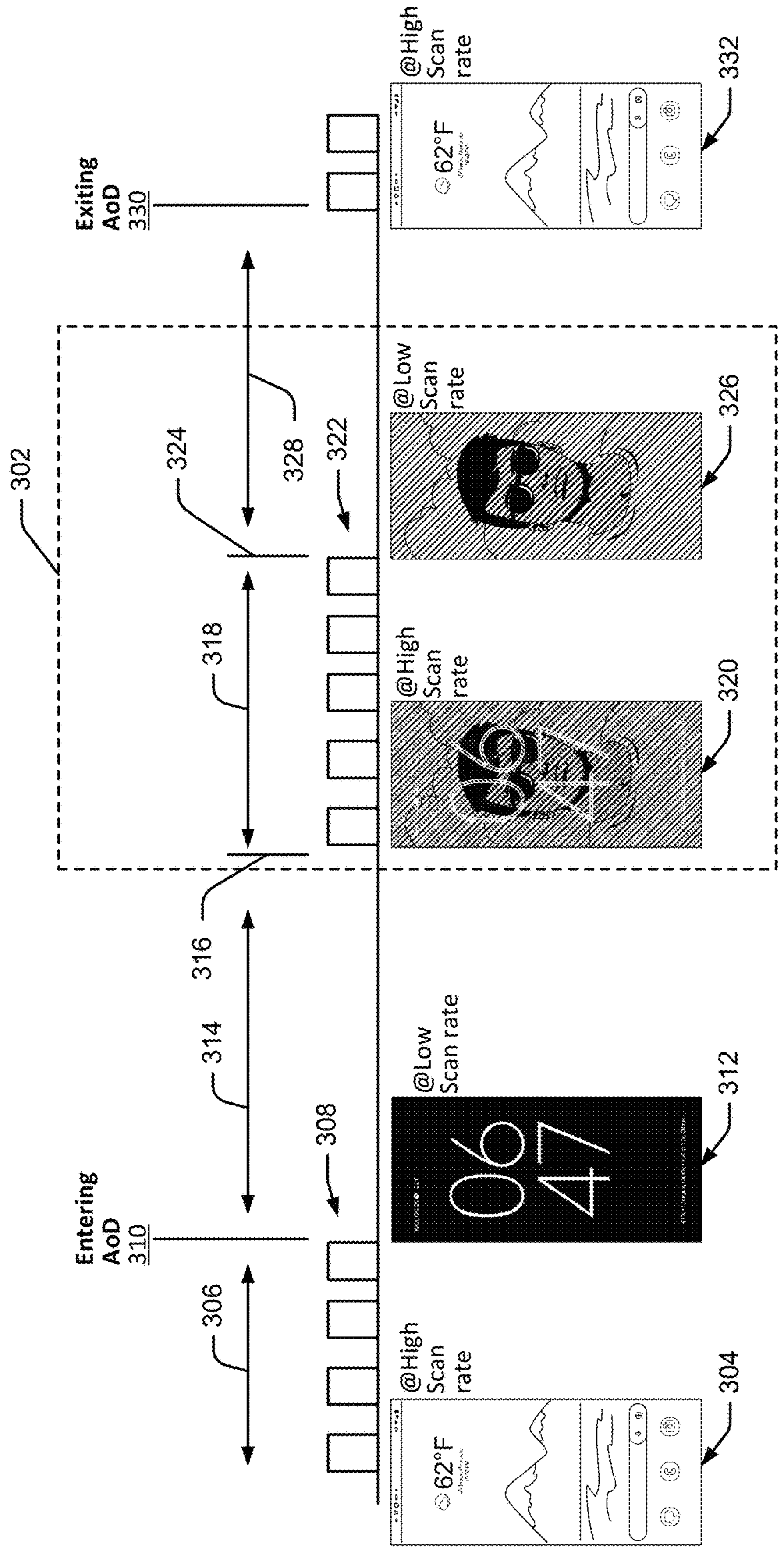
FIG. 3 illustrates an example operation of image-ghosting mitigation in accordance with an implementation of the technology described herein.

FIG. 3 illustrates an example scenario 300 of an example operation of image-ghosting mitigation 302 on AOD panels when displaying high OPR images. The example scenario 300 includes user equipment (e.g., user equipment 202) displaying a home-screen image 304 on a multi-scan capable AOD panel (e.g., multi-scan capable AOD panel 206) in a standard panel driving mode 306, which is presumably a high scan rate (e.g., 120 Hz).

A home screen is the primary interface layer of a mobile operating system, serving as the initial access point for user engagement. It often presents a hierarchical arrangement of application icons, widgets, and system controls, facilitating user interaction with the device's core services and installed applications. Since the home screen often involves user engagement, the central control (e.g., SoC 204) is active and thus not powered down (e.g., sleep mode).

Indeed, the multi-scan capable AOD panel displays a series of 308 frames at a high scan rate in response to the direction of the central control. Thus, in order to send such directions to the multi-scan capable AOD panel, the central control is active and powered up.

At 310, the multi-scan capable AOD panel switches to AOD mode. In this mode, the panel driver directs the multi-scan-rate-capable AOD panel display to present a first OPR image at a low scan rate 314 (e.g., 30 Hz). The first OPR image is like, for example, the low OPR image 102 of FIG. 1 and as displayed at 312. Indeed, the first OPR image is a low OPR image (e.g., the ratio of on-pixels of the first OPR image is less than 25%). In the AOD mode, the display often provides helpful information (e.g., time, notifications, battery status). As depicted, the displayed first OPR image 312 displays that kind of information.

In the AOD mode, the device enters a low-power state by, for example, placing the central control in sleep mode and utilizing selective pixel activation. Typically, the AOD mode is triggered by a defined period of non-engagement by a user of the device. For example, if the user has not interacted with the device for two minutes, the display panel may switch to AOD mode.

The image-ghosting mitigation phase 302 example operation is activated at 316. The phase may be triggered by the AOD panel receiving a second OPR image (e.g., high OPR image 104 of FIG. 1 and such an image is displayed at 326). The second OPR image has a ratio of on-pixels greater than the first OPR image. Thus, relative to each other, the second OPR image may be described as a high-OPR image, while the first OPR image may be described as a low-OPR image. The image-ghosting-mitigation phase may occur for a defined time (e.g., one second) or after the completion of several tasks (e.g., multiple frame refreshes).

During the image-ghosting-mitigation phase 302, the AOD panel switches to a high scan rate 318. The high scan rate 318 (e.g., 120 Hz) is greater than the low scan rate 314 (e.g., 30 Hz). At that high scan rate 318, the panel driver sends (e.g., frame insertion or update) the second OPR image to the AOD panel. Consequently, the AOD panel displays a ghosted image 320 is displayed as a combination of both the first and second OPR images, The ghosted image 320 includes the newly displayed second OPR image with a residual or "ghost" image of the first OPR image. The ghosted image 320 looks much like the first ghosted image 108, as shown in FIG. 1.

During the image-ghosting-mitigation phase 302, the panel driver sends a series of frames 322 of the second OPR image at the high scan rate to the AOD panel. This may be described as inserting, updating, or presenting multiple frames of the second OPR image at the high scan rate. With each subsequent frame update, the residual image of the first OPR image will fade away with each subsequently displayed combined image.

The image-ghosting-mitigation phase 302 is performed without the active and on-going direction by the central control. Instead, when in the image-ghosting-mitigation phase 302, the panel driver is configured to perform the procedure of the phase (e.g., frame insertions). Thus, during this phase, the central control can remain inactive and consume minimum power (e.g., in sleep mode).

At 324, the image-ghosting-mitigation phase 302 ends when the panel driver switches the AOD panel to a low scan rate 328 of the AOD mode. This low scan rate 328 may match the low scan rate 314 employed before the phase was initiated. This may occur, for example, after a defined period of time or after a defined number of frame updates.

The resulting image 326 displayed at the end of the image-ghosting-mitigation phase 302 is the second OPR image at the low scan rate 328 without any residual image remaining from the first OPR image. This may be described as updating, inserting, or presenting one or more frames of the second OPR image at the low scan rate. While in AOD mode, the AOD display presents a high OPR image.

As depicted, at 330, the device exits AOD mode. This may occur because the user actively engages with the user equipment once again. Consequently, the device may display a home image 332 of a home screen.

Figure 4:
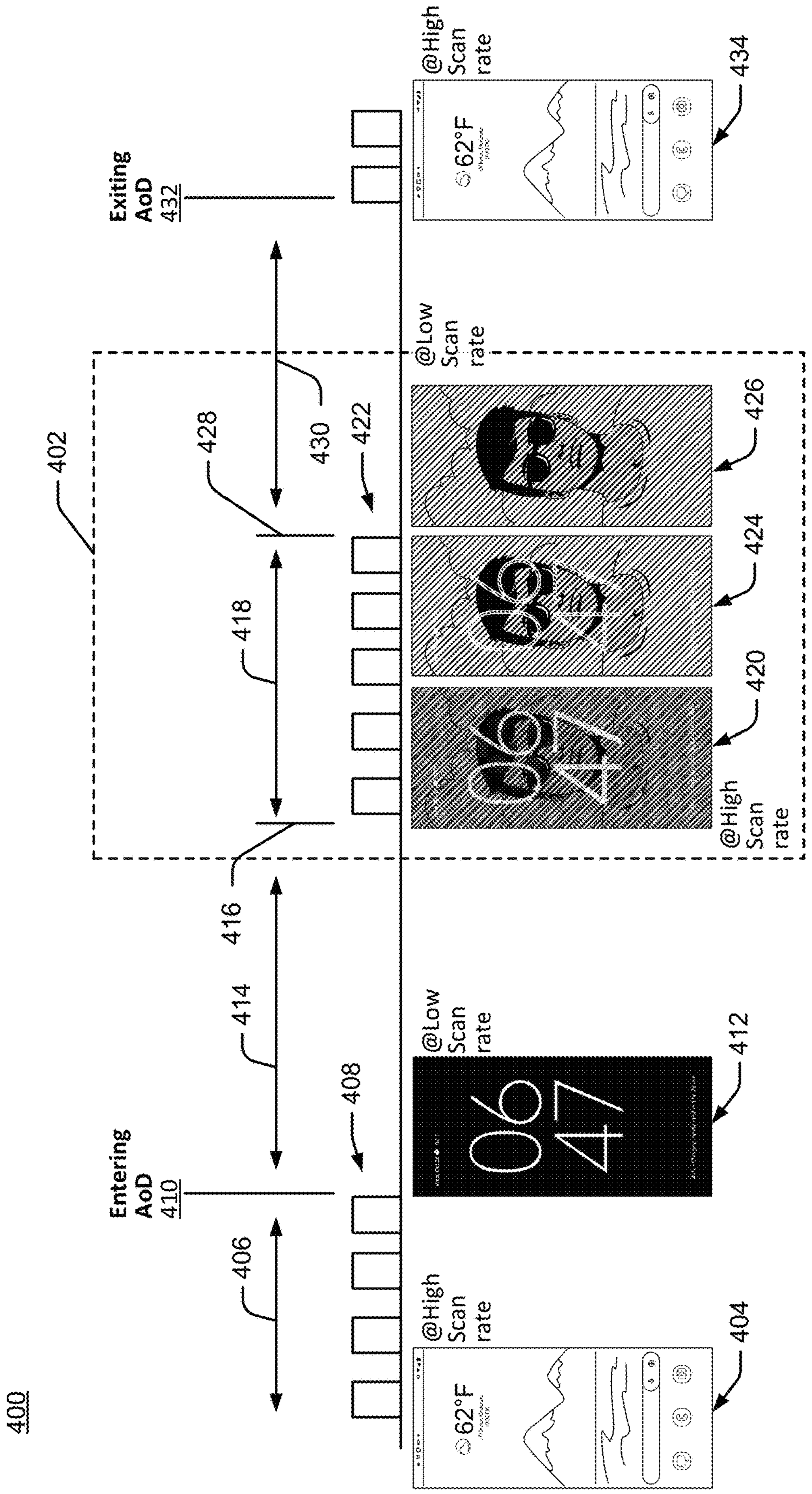
FIG. 4 illustrates another example operation of image-ghosting mitigation, in accordance with an implementation of the technology described herein, that minimizes transitional flicker.

FIG. 4 illustrates an example scenario 400 of another example operation of image-ghosting mitigation 402 on AOD panels when displaying high OPR images. In particular, the example operation of image-ghosting mitigation 402 minimizes transitional flicker. When the AOD panel switches to high scan rate and displays a high OPR image, a noticeable transitional flicker may occur.

Transitional flicker occurs when a multi-scan display switches between different refresh rates. This visual artifact appears during rapid changes between frequencies (e.g., low to high). The display shifts its timing patterns when moving between refresh rates. For example, a 30 Hz refresh rate uses 33.33 ms frame intervals. A 120 Hz rate uses 8.33 ms intervals. This sudden change disrupts normal display operation.

The timing change forces rapid adjustments in voltage and power delivery. These adjustments create visible instabilities in pixel illumination. The display cannot maintain stable image output during the transition period. High-contrast content makes these instabilities more noticeable. Fast-moving images amplify the effect. The severity depends on how large the refresh rate change is. Bigger jumps between refresh rates produce more prominent flicker. The speed of the transition also affects visibility. Faster transitions tend to show more noticeable artifacts.

To minimize the noticeability of the transitional flicker, the transitional-flicker-minimizing image-ghosting mitigation 402 lowers the intensity of the initially displayed high OPR image and slowly increases the intensity during the image-ghosting mitigation phase. Since the flicker occurs primarily at the switch in scan rate (e.g., from low to high frequency), the initial display of a lowered-intensity image reduces the notice of such a flicker. Overall, the transitional-flicker-minimizing image-ghosting mitigation 402 gives the viewer the effect of a fade-in of the high OPR image.

The example scenario 400 includes user equipment (e.g., user equipment 202) displaying a home-screen image 404 on a multi-scan capable AOD panel (e.g., multi-scan capable AOD panel 206) in a standard panel driving mode 406, which is presumably a high scan rate (e.g., 120 Hz).

The multi-scan capable AOD panel displays a series of 408 frames at a high scan rate in response to the direction of the central control. Thus, in order to send such directions to the multi-scan capable AOD panel, the central control is active and powered up.

At 410, the multi-scan capable AOD panel switches to AOD mode. In this mode, the panel driver directs the multi-scan-rate-capable AOD panel display to present a first OPR image at a low scan rate 414 (e.g., 30 Hz). The first OPR image is like, for example, the low OPR image 102 of FIG. 1 and as displayed at 412. Indeed, the first OPR image is a low OPR image (e.g., the ratio of on-pixels of the first OPR image is less than 25%). In the AOD mode, the display often provides helpful information (e.g., time, notifications, battery status). As depicted, the displayed first OPR image 412 displays exactly that kind of information.

The transitional-flicker minimizing image-ghosting mitigation phase 402 example operation is activated at 416. The phase may be triggered by the AOD panel receiving a second OPR image (e.g., high OPR image 104 of FIG. 1 and such an image is displayed at 426). The image-ghosting-mitigation phase may occur for a defined time (e.g., one second) or after the completion of several tasks (e.g., multiple frame refreshes).

During the transitional-flicker minimizing image-ghosting-mitigation phase 402, the AOD panel switches to a high scan rate 418. The high scan rate 418 (e.g., 120 Hz) is greater than the low scan rate 414 (e.g., 30 Hz). At that high scan rate 418, the panel driver sends (e.g., frame insertion or update) the second OPR image to the AOD panel. Consequently, the AOD panel displays a ghosted image 420 is displayed as a combination of both the first and second OPR images, The ghosted image 420 includes the newly displayed second OPR image with a residual or "ghost" image of the first OPR image. The ghosted image 420 looks much like the first ghosted image 108, as shown in FIG. 1.

In addition, the transition at 416 from the low scan rate to the high scan can cause noticeable transitional flicker. To minimize that, the panel driver sends an increasing-intensity sequence of multiple frames 422 of the second OPR image at the high scan rate to the AOD panel. Before sending them, the panel driver modifies the multiple frames of the second OPR image into a sequence of frames with increasing image intensity. Thus, the sequence of multiple frames 422 is the increasing-intensity sequence of frames.

Image intensity represents the brightness of each pixel in a digital image. Each pixel receives a numerical value (e.g., between 0 and 255). The system stores these values in a coordinate grid I(x,y). This grid maps each brightness value to its precise spatial location. The system calculates statistical measures like mean intensity and variance using this array.

During the transitional-flicker minimizing image-ghosting mitigation phase 402, the intensity of the displayed image (e.g., second OPR image) increases over time. This is accomplished by, at least in part, modifying the image in varying degrees of intensity and arranging a sequence of such image (e.g., in frames) from least intense to most intense.

In one or more implementations, the modification of the sequence of multiple frames 422 includes applying a decreasing ratio of alpha layer across the frames of the sequence. The alpha layer functions as a specialized transparency control mechanism within the panel driver. The panel driver implements alpha layer through a buffer (e.g., an 8-bit depth buffer). This buffer assigns transparency values (e.g., between 0 and 255) to each pixel. The hardware dedicates specific memory allocation for the alpha buffer within the display controller. The compositing engine processes these values in real-time. The panel driver manages the alpha layer through register controls. These controls initialize the buffer, update transparency values, and synchronize frame updates. The alpha layer enables granular opacity control at the pixel level.

The sequence of frames is modified by applying a decreasing ratio of the alpha layer across the frames of the sequence. This creates a controlled transparency progression in a temporal sequence. The alpha buffer values are modified for consecutive frames. Each frame operation begins with the allocation of specific alpha values from the buffer. The initial frame maintains maximum opacity with a high alpha value (e.g., 255). A mathematical ratio function is applied to determine subsequent transparency levels. Each new frame receives a decremented alpha value according to this ratio.

The panel driver updates these buffer values synchronously with frame timing. A compositing engine processes modified alpha values in real-time during frame presentation. This process maintains color data integrity while enabling transparency transitions. Precise temporal alignment is assured between alpha modifications and frame updates. This technique facilitates smooth dissolution effects for overlay elements and content transitions. The decreasing ratio progression continues until the designated terminal alpha value for the sequence is reached.

In one or more other implementations, the modification of the sequence of multiple frames 422 includes applying a gradient compression ratio of gamma across the frames of the sequence. The gradient compression ratio (gamma or y) defines the mathematical relationship between input voltage and output luminance. This relationship follows a power-law function where luminance equals voltage raised to the gamma power. The gamma parameter accounts for the human visual system's logarithmic response to brightness changes. Different display technologies exhibit distinct gamma characteristics. The panel driver presents the sequence of multiple frames 422 in the increasing-intensity sequence on increasing image intensity on the display. This may be described as inserting, updating, or presenting the sequence of multiple frames 422 at the high scan rate.

Applying a gradient compression ratio of gamma across frame sequences systematically transforms luminance values in temporal image data. Each frame undergoes a power-law transformation where luminance equals voltage raised to the gamma power. The process begins with frame acquisition and normalization of pixel values to a range between zero and one. Each frame then undergoes the power-law transformation using the specified gamma value. The transformed values undergo re-quantization to match the target bit depth. This sequence continues for all subsequent frames in the temporal sequence. The transformation modifies how luminance values are distributed across the entire sequence.

Displayed images 420, 424, 426 represent examples of the images presented as part of the increasing-intensity sequence of multiple frames 422. As illustrated by displayed images 420, 424, 426, the residual image of the first OPR image will fade away with each subsequently displayed combined image.

Displayed image 420 has the lowest intensity and, thus, is depicted darker and with the lowest contrast of the sequence. Next, displayed image 424 has greater intensity than displayed image 420 and, thus, is depicted lighter and with more contrast than displayed image 420. Last, displayed image 426 has the most intensity of the increasing-intensity sequence of multiple frames 422 and, thus, is depicted as the lightest and with the most contrast of the sequence.

The transitional-flicker minimizing image-ghosting-mitigation phase 402 is performed without the active and on-going direction by the central control. Instead, when in the transitional-flicker minimizing image-ghosting-mitigation phase 402, the panel driver is configured to perform the procedure of the phase (e.g., frame insertions). Thus, during this phase, the central control can remain inactive and consume minimum power (e.g., in sleep mode).

At 428, the transitional-flicker minimizing image-ghosting-mitigation phase 402 ends when the panel driver switches the AOD panel to a low scan rate 430 of the AOD mode. This low scan rate 430 may match the low scan rate 414 employed before the phase was initiated. This may occur, for example, after a defined period of time or after a defined number of frame updates.

The resulting image 426 displayed at the end of the transitional-flicker minimizing image-ghosting-mitigation phase 402 is the second OPR image at the low scan rate 430 without any residual image remaining from the first OPR image. This may be described as inserting, updating, or presenting one or more frames of the second OPR image at the low scan rate. While in AOD mode, the AOD display presents a high OPR image.

As depicted, at 432, the device exits AOD mode. This may occur because the user actively engages with the device once again. Consequently, the device may display a home image 434 of a home screen.

Example Image—Ghosting Mitigation Methods

Figure 5:
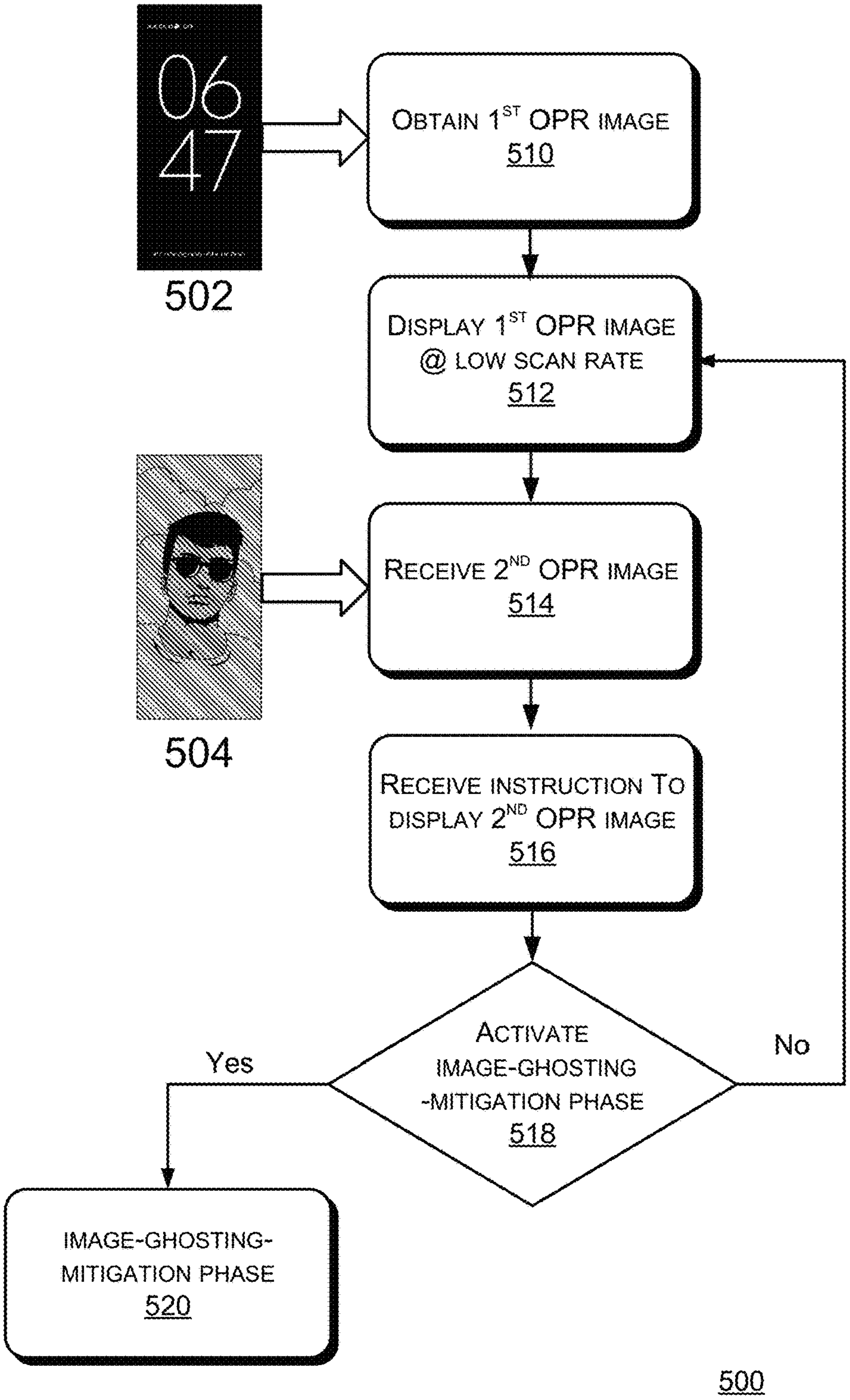
FIG. 5 illustrates an example method for image-ghosting mitigation on AOD panels when displaying high OPR images in accordance with one or more implementations described herein.

FIG. 5 illustrates an example method 500 for image-ghosting mitigation on AOD panels when displaying high OPR images in accordance with one or more implementations described herein.

At 510, a display panel (e.g., display panel 206) of user equipment (such as user equipment 202) obtains a first on-pixel ratio (OPR) image (such as low OPR image 502). The ratio of on-pixels of the first OPR image is selected from a group consisting of less than 40%, less than 30%, less than 25%, less than 20%, less than 15%, less than 10%, and less than 5%.

At 512, the display panel displays the user equipment's first image at a low scan rate (e.g., 30 Hz) on a multi-scan-rate-capable display panel (e.g., the multi-scan capable AOD panel 306). This may be, for example, the AOD mode of the user equipment.

At 514, the display panel receives a second OPR image (such as high OPR image 504). The ratio of on-pixels of the second OPR image is selected from a group consisting of greater than 50%, greater than 60%, greater than 70%, greater than 80%, greater than 85%, greater than 90%, and greater than 95%. The second OPR image has a greater ratio of on-pixels than the first OPR image.

At 516, the display panel receives an instruction from central control (e.g., SoC 204) to display the second OPR image and/or to initiate the image-ghosting-mitigation phase.

At 518, the display panel determines whether to activate an image-ghosting-mitigation phase of the display panel. If not, then the example method 500 returns to the display of the first OPR image at 512. In other words, the display panel continues to display the first OPR image at the low scan rate. There is no noticeable change.

The display panel may determine to activate the image-ghosting-mitigation phase when the panel has received both the second OPR image and the appropriate instruction. Such instruction may be to display the second OPR image or to initiate the image-ghosting-mitigation phase. In some instances, an instruction is not employed. In those instances, just receiving the second OPR image is sufficient to initiate activation of the phase.

At 520, the image-ghosting mitigation phase is activated. The phase may be active, for example, after a defined period of time (e.g., 1 second) or after a defined number of frame updates. The details of the image-ghosting mitigation phase 520 is provided below with regard to FIG. 6.

FIG. 6 illustrates another example method 600 for image-ghosting mitigation on AOD panels when displaying high OPR images in accordance with one or more implementations described herein. The example method 600 details the image-ghosting mitigation phase 520, shown in FIG. 5.

At 610, a display panel (e.g., display panel 206) of user equipment (such as user equipment 202) switches to a high scan rate (e.g., 120 Hz), which is greater than the low scan rate (e.g., 30 Hz) that the first OPR image was being displayed at 512 of FIG. 5.

At 612, the display panel displays the second OPR image at the high scan rate.

At 614, to minimize transitional flicker, the panel driver modifies multiple frames of the second OPR image into a sequence of frames with increasing image intensity. Thus, the sequence of multiple frames is one of an increasing-intensity sequence of frames. In one instance, this may be accomplished, for example, applying a decreasing ratio of alpha layer across the frames of the sequence. In another instance, this may be accomplished by applying a gradient compression ratio of gamma across the frames of the sequence. Operation 614 is performed when transitional flicker is sought to be minimized. Otherwise, operation 614 is not performed.

At 616, the display panel inserts the sequence of the multiple frames of the second OPR image at the high scan rate to the display panel. When a transitional flicker is being minimized, the sequence is the increasing-intensity sequence of frames.

At 618, the panel displays frames of the sequence from low to high intensity as a result of the frame insertions. This is illustrated, in part, by low-intensity ghosted image 602 followed by mid-level intensity ghosted image 604.

At 620, after a defined period of time (e.g., one second) or a number of frame updates, the image-ghosting mitigation phase ends with the panel driver switching the panel to a low scan rate (e.g., 30 Hz). This effectively returns the panel back to AOD mode.

Thus, at 622, the panel driver continues to display the second OPR image at the low scan rate. Image 606 depicts a display of the second OPR image at the low scan rate.

CONCLUSION

Although implementations of techniques for, and apparatuses enabling, mitigating image ghosting on Always-On Display (AOD) panels when displaying high On-Pixel Ratio (OPR) images have been described in language specific to features and/or methods, it is to be understood that the subject of the appended claims is not necessarily limited to the specific features or methods described. Rather, the specific features and methods are disclosed as example implementations enabling technology for reducing image ghosting on Always-On Display (AOD) panels when displaying high On-Pixel Ratio (OPR) images.

What is claimed is:

1. A method comprising:

displaying a first on-pixel ratio (OPR) image at a low scan rate on a multi-scan-rate-capable display panel of a user equipment;

receiving a second OPR image, wherein the second OPR image has a ratio of on-pixels that is greater than that of the first OPR image; and activating an image-ghosting-mitigation phase of the display panel for a defined time, wherein the image-ghosting-mitigation phase includes:

switching the display panel to a high scan rate, the high scan rate greater than the low scan rate;

displaying the second OPR image at the high scan rate on the display panel, the displaying the second OPR image at the high scan rate including:

modifying multiple frames of the second OPR image into an increasing-intensity sequence of frames with increasing image intensity; and presenting the multiple frames in the increasing-intensity sequence on increasing image intensity;

switching the display panel to the low scan rate; and displaying the second OPR image at the low scan rate on the display panel.

2. The method of claim 1, wherein the ratio of on-pixels of the first OPR image is selected from a group consisting of less than 40%, less than 30%, less than 25%, less than 20%, less than 15%, less than 10%, and less than 5%.

3. The method of claim 1, wherein the ratio of on-pixels of the second OPR image is selected from a group consisting of greater than 50%, greater than 60%, greater than 70%, greater than 80%, greater than 85%, greater than 90%, and greater than 95%.

4. The method of claim 1, wherein the high scan rate at least twice that of the low scan rate.

5. The method of claim 1, wherein the displaying of the first OPR image at the low scan rate includes presenting one or more frames of the first OPR image at the low scan rate.

6. The method of claim 1, wherein:

the displaying of the second OPR image at the high scan rate includes presenting multiple frames of the second OPR image at the high scan rate; and the displaying the second OPR image at the low scan rate includes presenting one or more frames of the second OPR image at the low scan rate.

7. The method of claim 1, wherein the modifying of the multiple frames into the increasing-intensity sequence includes applying a decreasing ratio of alpha layer across the frames of the sequence.

8. The method of claim 7, wherein the alpha layer is implemented through a depth buffer that assigns transparency values to each pixel, and wherein an initial frame of the sequence maintains a maximum opacity and each subsequent frame receives a decremented alpha value.

9. The method of claim 1, wherein the modifying of the multiple frames into the increasing-intensity sequence includes applying a gradient compression ratio of gamma across the frames of the sequence.

10. The method of claim 9, wherein applying the gradient compression ratio of gamma comprises applying a power-law function where a luminance equals a voltage raised to a gamma power.

11. The method of claim 1 further comprising:

receiving an instruction to display the second OPR image or to initiate the image-ghosting-mitigation phase; and initiating the image-ghosting-mitigation phase in response to the received instruction.

12. The method of claim 1, wherein the display panel operating at the low scan rate is in an Always-on Display (AoD) mode.

13. The method of claim 12, wherein the Always-on Display (AoD) mode is triggered by a defined period of non-engagement by a user of the user equipment, and wherein the method further comprises exiting the AoD mode in response to active user engagement to display a home screen image.

14. The method of claim 1, wherein the image-ghosting-mitigation phase is performed by a panel driver while a central control of the user equipment remains in an inactive or sleep mode.

* * * * *